United States Patent Office 3,472,805
Patented Oct. 14, 1969

3,472,805
POLYPROPYLENE STABILIZED WITH COMBINATIONS OF A PHOSPHONATE, TRIAZINE AND THIODIPROPIONATE
Paul J. Marinaccio, Tenafly, and Joseph M. Kelley, Westfield, N.J., assignors to Dart Industries, Inc., Los Angeles, Calif., a corporation of Delaware
No Drawing. Filed Nov. 21, 1966, Ser. No. 595,630
Int. Cl. C08f 3/08, 45/60
U.S. Cl. 260—23
2 Claims

ABSTRACT OF THE DISCLOSURE

Polypropylene compositions that contain a hydroxybenzyl phosphonate, a substituted 1,3,5-triazine and distearyl thiodipropionate have thermal oxidative stability and resistance to extraction by aqueous solutions. Such compositions are particularly used in fibers and injection molded articles.

BACKGROUND OF THE INVENTION

Field of the invention

This invention relates to compositions of polypropylene having improved stability against degradation caused by exposure to heat and oxygen and improved resistance to extraction by aqueous solutions. More particularly, it relates to solid substantially crystalline polypropylene compositions suitable for use in molded and other fabricated articles of manufacture including monofilament and multifilament fibers.

The compositions of this invention find particular use in fibers and injection molded articles which are subjected to thermal and oxidative degradation and frequent contact with aqueous solutions. Examples of end products made with these compositions include electrical appliances, clothes washers, dish washers, refrigerators, "under-the-hood" automotive parts, indoor carpets and rug backings.

Description of the prior art

Prior art additives systems are available which improve the stability of polypropylene against deterioration from exposure to heat and oxygen. Such systems contain a synergist such as dilauryl thiodipropionate or distearyl thiodipropionate and one or more antioxidants (see U.S. Patents 3,033,814; 3,072,603; 3,235,532; 3,245,949; and 3,271,339 and Indian Patent 79,507 and Belgian Patents 59,583 and 601,434). Although the systems taught by the prior art have solved to some extent the problems of oxidative and thermal instability of polypropylene, there is still room for improvement. None of the prior art additive systems for polypropylene have been found which achieve a proper balance between oxidative and thermal stability on the one hand and resistance to extraction of the additives by aqueous solutions on the other.

SUMMARY OF THE INVENTION

An object of the present invention is to provide a solid substantially crystalline polypropylene composition which is both stable against thermal and oxidative degradation and resistant to extraction by aqueous solutions.

Another object of this invention is to provide solid substantially crystalline polypropylene compositions which have the optimum balance between the desired properties for injection molded articles and monofilament and multifilament fibers.

The present invention provides a solid substantially crystalline polypropylene composition which comprises a hydroxybenzyl phosphonate, a substituted 1,3,5-triazine and a diester of thiodipropionic acid.

The hydroxybenzyl phosphonate is contained in the composition of the present invention in amounts in the range of about 0.01 to 1% based on the weight of polypropylene and has the following formua:

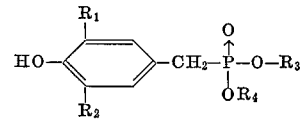

wherein each of $R_1$ and $R_2$ is an alkyl group having 4 to 8 carbon atoms and each of $R_3$ and $R_4$ is an alkyl having 16 to 20 carbon atoms.

The substituted 1,3,5-triazine is contained in this composition in amounts in the range of about 0.01 to 1% based on the weight of polypropylene and has the following formula:

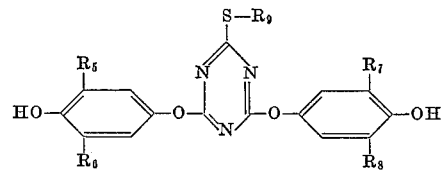

wherein each of $R_5$, $R_6$, $R_7$ and $R_8$ is an alkyl group having 4 to 8 carbon atoms and $R_9$ is an alkyl group having 6 to 10 carbon atoms.

The diester of thiodipropionic acid is contained in the composition of this invention in amounts in the range of 0.001 to 1% based on the weight of polypropylene and consists of dilauryl thiodipropionate (DLTDP) or distearyl thiodipropionate (DSTDP) or stearyl-lauryl thiodipropionate or mixtures thereof.

THE PREFERRED EMBODIMENTS OF THIS INVENTION

The preferred hydroxybenzyl phosphonate is dioctadecyl 3,5-di-t-butyl-4-hydroxybenzyl phosphonate (hereinafter referred to as the hydroxybenzyl phosphonate) and is added to the composition in amounts of about 0.05 to 0.5% based on the weight of polypropylene. This additive compound can be obtained in commercial quantities in the form of a white crystalline powder having a melting point in the range of about 52° to 57° C.

The preferred 1,3,5-triazine is 2,4-bis-(3,5-di-t-butyl-4-hydroxyphenoxy)-6-(n-octylthio) - 1,3,5-triazine (hereinafter referred to as the 1,3,5-triazine) and is in the composition in amounts of about 0.05 to 0.5% based on the weight of polypropylene. This additive compound can be commercially obtained in the form of a white crystalline powder and can be prepared in a manner set forth on page 13, line 20 through page 15, line 26 of Indian Patent 79,507.

The preferred diester of thiodipropionic acid is distearyl thiodipropionate and is added to the composition in amounts of about 0.05 to 0.5% based on the weight of polypropylene.

The weight ratio of the hydroxybenzyl phosphonate to the 1,3,5-triazine should be in the range of 0.5 to about 2 and preferably in the range of about 1 to 1.5. Although the amount of each of these additives may exceed 1% of the weight of polypropylene, it has been found that higher amounts do not sufficiently increase the desired properties of the composition to warrant the extra cost of the incremental amounts. In fact, amounts in excess of 2% decrease the desired properties of the composition. The total amounts of all of the additives including the DSTDP and/or DLTDP synergists should be in the range of about 0.3 to 1.5% and preferably in the range of about 0.5 to 1.3 based on the total weight of polypropylene.

As an optional ingredient to the composition of this invention, calcium stearate can be used if desired. While it is generally employed in amounts from about 0.01 to 1% based on the weight of polypropylene, any amount which is comparable with the composition may be used.

The term "polypropylene" is used in the specification and claims in its conventional sense to mean the propylene homopolymer or a propylene copolymer containing minor amounts (i.e., about 5% or less) of one or more alpha-olefin comonomers. The polypropylene has a minimum heptane insolubility of 70%. It is preferable that the polypropylene have a heptane insolubility of at least 85% to assure sufficient crystallinity for the desired end use applications. The compositions of this invention containing the polypropylene can contain optional ingredients such as pigments, delustrants, plasticizers, flame retardant materials, antistatic agents and other such materials known in the art. These compositions can even contain other plastics blended with the polypropylene.

The following examples are given to illustrate the preferred embodiments of this invention and are not intended to limit its scope. All percentages of the constituents making up the polypropylene compositions are based on the weight of polypropylene.

EXAMPLES 1–8

These examples illustrate the improvement in the thermal and oxidative stability of compositions of the present invention over the thermal and oxidative stability of controls of polypropylene which contain no more than two of the three claimed constituents.

A commercial polypropylene having a density of about 0.905 to 0.915, a melt index at 230° C. of about 3 gms./10 min. and containing about 96% heptane insolubles was mixed with the constituents indicated in Table I for both the controls and the examples in a dry powder blender until a homogeneous composition was obtained. The mixture was melt extruded at 220° C., cooled and pelletized.

The samples of the resulting pellets were tested for thermal and oxidative stability by a tentative ASTM U-tube method. This method is an accelerated test of the resistance of polypropylene compositions to oxidation when exposed to oxygen at 150° C. The results of this test have been widely used as an index for long term heat aging (LTHA) characteristics. The pellets were placed in each leg of a U-tube to a height of about 4 cm. and 4 mm. OD glass beads were added on top of the pellets for an additional 10 cm. The U-tube in a holder was placed into an oil bath at 150° C. The ends of the U-tube were connected to a compressed oxygen system and oxygen at atmospheric pressure was then passed through the U-tube containing the test sample at a rate of 10 cc./min. The sample was checked daily for signs of failure indicated by crazing which consists of small cracks which progress across the surface of the sample. Failure was reached when all of the pellets in the U-tube became discolored and crazed and were easily crushed between the fingers, indicating their complete embrittlement. The pellets often become discolored prior to their embrittlement so that color change alone cannot be used as the basis for failure.

Table I below summarizes the thermal oxidative stability data of the polypropylene compositions by the U-tube method:

TABLE I.—THERMAL OXIDATIVE STABILITY BY U-TUBE METHOD

| Example | Percent hydroxybenzyl phosphonate | Percent 1,3,5-triazine | Percent DSTDP | Days to failure at 150° C. |
|---|---|---|---|---|
| Control A | 0.1 | | | 1 |
| Control B | | 0.1 | | 2 |
| Control C | | | 0.2 | 4 |
| Control D | 1.0 | | 0.3 | 12 |
| Control E | | 1.0 | 0.3 | 12 |
| Example 1 | 0.05 | 0.05 | 0.2 | 9 |
| Example 2 | 0.05 | 0.05 | 0.3 | 11 |
| Example 3 | 0.1 | 0.1 | 0.3 | 23 |
| Example 4 | 0.1 | 0.1 | 0.4 | 20 |
| Example 5 | 0.15 | 0.15 | 0.3 | 21 |
| Example 6 | 0.15 | 0.15 | 0.4 | 23 |
| Example 7 | 0.2 | 0.2 | 0.4 | 24 |
| Example 8 | 0.5 | 0.5 | 0.3 | 26 |

As shown in Table I, the addition of the hydroxybenzyl phosphonate (Control A) or the addition of the 1,3,5-triazine (Control B) to polypropylene by itself shows little improvement in its thermal and oxidative stability. For comparison, unstabilized polypropylene has a U-tube life of about 3 hours. As shown by the results for Control C, DSTDP was found to improve the thermal and oxidative stability of polypropylene to a greater extent than either of the other two claimed constituents, i.e., the hydroxybenzyl phosphonate and the 1,3,5-triazine. The addition of DSTDP to either of the other two constituents has a synergistic effect on the thermal oxidative stability of polypropylene.

The results of Table I indicate that a greater synergistic effect occurs when DSTDP is combined with the hydroxybenzyl phosphonate and the 1,3,5-triazine than when DSTDP is combined with either of these two claimed constituents alone. This is particularly apparent on comparing the results of Examples 3 through 8 with Controls C and D. As shown by the results of Examples 1 through 8, the U-tube lives of the polypropylene compositions increase by increasing both the hydroxybenzyl phosphonate and 1,3,5-triazine contents from the lower to the upper ends of the desired range. The results of Examples 7 and 8 indicate only a small increase in the U-tube lives by increasing each of these two claimed constituents from 0.2 to 0.5%. Increasing either of these two constituents beyond 0.5% has little if any effect on the thermal and oxidative stability of the claimed compositions.

EXAMPLES 9–20

These examples illustrate the improvement in the LTHA of polypropylene in a forced draft air oven of the compositions of the present invention over polypropylene controls each containing no more than one of the claimed constituents.

A commercial polypropylene, the same as that used in Examples 1 through 8, was mixed with the constituents indicated in Table II below for the examples and controls in a dry powder blender until a homogeneous composition was obtained. The mixture was then compression molded into 6" x 6" x 28 mil plaques at 425° F. and 25,000 p.s.i.g. for 60 seconds. The plaques of the examples and controls were rapidly cooled at the high pressure and cut into ½" x 1½" by 28 mil strips. Duplicate strips were placed on Pyrex glass plates and put into a Model 625A Freas forced draft oven at 150° C. The strips were checked daily for signs of failure. Failure was indicated as in Examples 1–8 above by discoloration, crazing and embrittlement. The oven life test like the U-tube test is an accelerated method for determining the heat and oxidative stability of polypropylene at elevated temperatures except that the effect of severe oxidation is less pronounced than in the U-tube test.

The results of the oven life test are given in Table II below:

TABLE II.—LTHA IN FORCED DRAFT OVEN

| Example | Percent hydroxybenzyl phosphonate | Percent 1,3,5-Triazine | Percent DSTDP | Percent DLTDP | Days to failure at 150° C. |
|---|---|---|---|---|---|
| Control A | 0.1 | | | | 16 |
| Control B | | 0.1 | | | 17 |
| Control C | | | 0.2 | | 9 |
| Control F | | | 0.5 | | 9 |
| Control G | 0.15 | | | | 26 |
| Control H | | 0.15 | | | 25 |
| Example 9 | 0.05 | 0.05 | 0.2 | | 77 |
| Example 10 | 0.05 | 0.05 | 0.3 | | 97 |
| Example 11 | 0.05 | 0.05 | 0.4 | | 110 |
| Example 12 | 0.075 | 0.075 | 0.2 | | 87 |
| Example 13 | 0.075 | 0.075 | 0.3 | | 108 |
| Example 14 | 0.075 | 0.075 | 0.4 | | 119 |
| Example 15 | 0.1 | 0.1 | 0.2 | | 91 |
| Example 16 | 0.1 | 0.1 | 0.3 | | 103 |
| Example 17 | 0.1 | 0.1 | 0.4 | | 113 |
| Example 18 | 0.05 | 0.05 | | 0.4 | 59 |
| Example 19 | 0.075 | 0.075 | | 0.4 | 74 |
| Example 20 | 0.1 | 0.1 | | 0.4 | 79 |

Table II indicates the dramatic increase in the oven life of compositions of this invention over compositions containing no more than one of the claimed additive constituents of this invention. Table II indicates the synergistic effect the combination of all three of the claimed constituents has on the stability of polypropylene. This synergistic effect is particularly evident on comparing the sum of the oven lives of Controls A, B and C with Example 15. The oven life of the composition of Example 15 is over twice that of the sum of the oven lives of the individual controls. Table II indicates that the increase in the level of DSTDP from 0.2 to 0.4% increases the oven lives of the polypropylene compositions whereas an increase in the levels of the hydroxybenzyl phosphonate and the 1,3,5-triazine at constant DSTDP levels has little oven life effect. Table II also indicates that DLTDP can be substituted for DSTDP. However, a loss in oven life was noted when this substitution was made.

EXAMPLES 21–24

These examples illustrate the thermal and oxidative stability of the polypropylene compositions of this invention which were prepared under commercial process conditions. In Examples 21–23 of Table III below, a commercial polypropylene having the same properties as that used in Examples 1–20 was used as the base of the compositions. A commercial block copolymer of polypropylene containing about 5 weight percent ethylene and about 95% heptane insolubles was used as the base of the composition of Example 24. Each of the compositions of Examples 21–24 was mixed with 0.15% of the hydroxybenzyl phosphonate, 0.1% of the 1,3,5-triazine and 0.3% of DSTDP in a dry powder blender until a homogeneous composition was obtained. The mixture was then melt extruded at a temperature of 232° C., cooled and pelletized. A portion of the pellets was tested by the U-tube method discussed under Examples 1–8 above. Another portion of the pellets was compression molded into 6" x 6" x 28 mil plaques and was tested by the oven life test method discussed under Examples 9–20 above.

The results of the U-tube and oven life tests are given in Table III below:

TABLE III.—THERMAL OXIDATION AND LTHA FOR MELT EXTRUDED PELLETS

| Example | LTHA in forced draft oven, days to failure | | Thermal oxidative stability by U-tube method, days to failure at 150° C. |
|---|---|---|---|
| | At 150° C. | At 160° C. | |
| Example 21 A | 73 | 29 | 24 |
| Example 21 B | 66 | 30 | 22 |
| Example 21 C | 69 | 29 | 24 |
| Example 22 | 70 | | 24 |
| Example 23 | | | 24 |
| Example 24 | | | 21 |

These results indicate that the U-tube lives of the compositions prepared under process conditions are in agreement with the U-tube lives of the compositions of Examples 1–8. However, there is some loss in oven life when the compositions were prepared in this manner.

The composition of Examples 21 A, B and C was tested to determine the oxygen absorption after a given length of time. In this test, ½" x 1½" x 28 mil strips of the compression molded plaques were placed in a gas burette with a small quantity of molecular sieves. The burette was evacuated and replaced with oxygen at atmospheric pressure. The burette was placed in an oil bath and heated to one of the temperatures indicated in Table IV below. The amount of oxygen absorbed into the sample in milliliters per gram of sample (ml. $O_2$/gm. sample) was measured over a period of time in minutes. The results of ml. $O_2$/gm. sample were plotted on the y-coordinate versus time on the x-coordinate. Table IV below indicates the induction period in hours which is an extrapolation of the linear portion onto the x-coordinate of the plot of the ml. $O_2$/gm. sample versus time.

TABLE IV.—OXYGEN ABSORPTION

| Example | Induction period in hours | |
|---|---|---|
| | At 140° C. | At 150° C. |
| Control I | 0 | 0 |
| Example 21 | 1,300 | 700 |

The significance of this oxygen absorption test is evident on comparing results of the composition of Example 21 with the composition of Control I which is an unstabilized homopolymer of polypropylene.

Another method for indicating the thermal oxidative stability of polypropylene is by a technique called differential thermal analysis (DTA). This technique is an extremely rapid method for comparing one stabilizer system against another. A sample of the composition of Example 21 was placed in a Perkin-Elmer differential scanning calorimeter (DSC) and heated from room temperature at a linear programmed rate of 20° C./min. until a degradation temperature was reached. This degradation temperature occurs after the sample melts and rapidly liberates heat due to the oxidation of the melted sample. The degradation temperature for the composition of Example 21 was found to be about 255° C. and was obtained after only about 11½ minutes in the calorimeter. In comparison, unstabilized polypropylene was found to have a degradation temperature of about 213° C. after about 9½ minutes. Thus, it can be seen that this DTA method is an extremely rapid and sensitive measure of the thermal oxidative stability of polypropylene.

Compositions of Examples 21 and 24 were also measured for their resistance to extraction by aqueous solutions by various wet/dry permanence tests. These tests measure the extractability of the additive systems from the stabilized polypropylene as well as the thermal oxidative stability of the polypropylene compositions. Each of the compositions was injection molded into a number of 6" x ¾" standard tensile bars. In these tests the tensile bars were subjected to conditions much more severe than normally exist in end use applications such as in dish washer and clothes washer parts. The procedure for each of these tests is briefly outlined in Table V below. The same type of forced draft oven was used in each of these tests as was used in the oven life test described under Examples 9–20 above. The detergent used in tests 1, 2 and 3 was Cascade sold by Procter and Gamble. Distilled water was used in tests 4 and 5. The unimmersed control of test 6 was heated in the oven at 300° for the period indicated in Table V below. The samples were periodically checked for the same type of failure that is described under Examples 1–8 above.

TABLE V.—WET/DRY PERMANENCE TESTS

| Test | Procedure | Hours to failure | |
|---|---|---|---|
| | | Example 21 | Example 24 |
| 1 | 7 days in 1% detergent soln. at 180° F. then in oven at 310° F. | 1,550 | 1,600 |
| 2 | 10 days in 1% detergent soln. at 180° F. then in oven at 300° F. | 1,800 | 1,800 |
| 3 | 60 days in 1% detergent soln. at 180° F. then in oven at 300° F. | 1,650 | 1,650 |
| 4 | 7 days in H₂O at 212° F., change H₂O each 24 hrs. then in oven at 300° F. | 1,100 | 1,400 |
| 5 | 7 days in H₂O at 212° F. then in oven at 248° F. for 7 days then repeat cycle. | (¹) | (¹) |
| 6 | Unimmersed control in oven at 300° F. | 1,450 | 1,450 |

¹ No failure after 5 cycles.

The results indicated in Table V show that compositions of the present invention have long lives under the severe conditions of these tests for wet/dry permanence. It has been found that such lives are equivalent to years of use under the actual conditions the stabilized polypropylene is normally subjected.

The foregoing examples illustrate the novel polypropylene compositions of the present invention. In contrast to other compositions, the compositions of this invention have greater stability against heat and oxygen and have greater wet/dry permanence. The unique synergistic combination of additives and polypropylene which make up the compositions of the present invention provides the optimum balance of all the desired properties for use in applications where stability against thermal and oxidative degradation and resistance to extraction by aqueous solutions are important.

What is claimed is:

1. A solid substantially crystalline polypropylene composition containing the following constituents based on the weight of said polypropylene:
   (a) about 0.05 to 0.5% of dioctadecyl 3,5-di-t-butyl-4-hydroxybenzyl phosphonate,
   (b) about 0.05 to 0.5% of 2,4-bis-(3,5-di-t-butyl-4-hydroxyphenoxy)-6-(n-octylthio)-1,3,5-triazine; and
   (c) about 0.05 to 0.5% of distearyl thiodipropionate, the total amount of said constituents being in the range of about 0.3 to 1.5%.

2. A composition as in claim 1 also containing calcium stearate, in an amount from about 0.01 to 1% based on the weight of said polypropylene.

References Cited

UNITED STATES PATENTS

| | | | |
|---|---|---|---|
| 3,188,298 | 6/1965 | Williamson et al. | 260—45.85 |
| 3,224,973 | 12/1965 | Knapp | 252—49.8 |
| 3,255,191 | 6/1966 | Dexter et al. | 260—248 |
| 3,280,070 | 10/1966 | Battista et al. | 260—45.85 |
| 3,335,108 | 8/1967 | Pines | 260—45.8 |

DONALD E. CZAJA, Primary Examiner

R. A. WHITE, Assistant Examiner

U.S. Cl. X.R.

260—45.8, 45.85, 45.95